United States Patent
Bothe

(10) Patent No.: US 10,718,960 B2
(45) Date of Patent: Jul. 21, 2020

(54) METHOD FOR PRODUCING CONTACT LENSES WITH WEARING COMFORT

(71) Applicant: Novartis AG, Basel (CH)

(72) Inventor: Harald Bothe, Niedernhausen (DE)

(73) Assignee: Alcon Inc., Fribourg (CH)

( * ) Notice: Subject to any disclaimer, the term of this patent is extended or adjusted under 35 U.S.C. 154(b) by 298 days.

(21) Appl. No.: 15/797,026

(22) Filed: Oct. 30, 2017

(65) Prior Publication Data

US 2018/0120590 A1 May 3, 2018

Related U.S. Application Data

(60) Provisional application No. 62/414,902, filed on Oct. 31, 2016.

(51) Int. Cl.
| | | |
|---|---|---|
| *G02C 7/04* | (2006.01) | |
| *B29D 11/00* | (2006.01) | |
| *B05D 3/14* | (2006.01) | |
| *G02B 1/04* | (2006.01) | |
| *B29K 83/00* | (2006.01) | |
| *B29K 105/00* | (2006.01) | |

(52) U.S. Cl.
CPC ............ *G02C 7/049* (2013.01); *B05D 3/144* (2013.01); *B29D 11/00038* (2013.01); *B29D 11/00067* (2013.01); *B29D 11/00923* (2013.01); *G02B 1/043* (2013.01); *B29K 2083/00* (2013.01); *B29K 2105/0061* (2013.01)

(58) Field of Classification Search
CPC .. G02B 1/043; B05D 3/144; B29D 11/00038; B29D 11/00067; B29D 11/00923
USPC ........................ 351/159.01, 159.02, 159.33
See application file for complete search history.

(56) References Cited

U.S. PATENT DOCUMENTS

| | | | |
|---|---|---|---|
| 3,408,429 A | 10/1968 | Wichterle | |
| 4,143,949 A | 3/1979 | Chen | |
| 4,312,575 A | 1/1982 | Peymen et al. | |
| 4,347,198 A | 8/1982 | Ohkada et al. | |
| 4,444,711 A | 4/1984 | Schad | |
| 4,460,534 A | 7/1984 | Boehm et al. | |
| 5,464,667 A | 11/1995 | Kohler et al. | |
| 5,508,317 A | 4/1996 | Muller | |
| 5,583,463 A | 12/1996 | Merritt | |
| 5,789,464 A | 8/1998 | Muller | |
| 5,843,346 A | 12/1998 | Morrill | |
| 5,849,810 A | 12/1998 | Muller | |
| 5,849,811 A | 12/1998 | Nicolson et al. | |
| 5,894,002 A | 4/1999 | Boneberger et al. | |
| 6,099,122 A | 8/2000 | Chabrecek et al. | |
| 6,218,508 B1 | 4/2001 | Kragh et al. | |
| 6,436,481 B1 | 8/2002 | Chabrecek et al. | |
| 6,440,571 B1 | 8/2002 | Valint et al. | |
| 6,447,920 B1 | 9/2002 | Chabrecek et al. | |
| 6,451,871 B1 | 9/2002 | Winterton et al. | |
| 6,465,056 B1 | 10/2002 | Chabrecek et al. | |
| 6,500,481 B1 | 12/2002 | Vanderlaan et al. | |
| 6,521,352 B1 | 2/2003 | Chabrecek et al. | |
| 6,586,038 B1 | 7/2003 | Chabrecek et al. | |
| 6,623,747 B1 | 9/2003 | Chatelier et al. | |
| 6,627,124 B1 | 9/2003 | Herbrechtsmeier et al. | |
| 6,630,243 B2 | 10/2003 | Valint et al. | |
| 6,719,929 B2 | 4/2004 | Winterton et al. | |
| 6,730,366 B2 | 5/2004 | Lohmann et al. | |
| 6,734,321 B2 | 5/2004 | Chabrecek et al. | |
| 6,793,973 B2 | 9/2004 | Winterton et al. | |
| 6,800,225 B1 | 10/2004 | Hagmann et al. | |
| 6,835,410 B2 | 12/2004 | Chabrecek et al. | |
| 6,878,399 B2 | 4/2005 | Chabrecek et al. | |
| 6,881,269 B2 | 4/2005 | Matsuzawa et al. | |
| 6,884,457 B2 | 4/2005 | Gilliard et al. | |
| 6,896,926 B2 | 5/2005 | Qiu et al. | |
| 6,923,978 B2 | 8/2005 | Chatelier et al. | |
| 6,926,965 B2 | 8/2005 | Qiu et al. | |
| 6,940,580 B2 | 9/2005 | Winterton et al. | |
| 7,078,074 B2 | 7/2006 | Matsuzawa et al. | |
| 7,297,725 B2 | 11/2007 | Winterton et al. | |
| 7,384,590 B2 | 6/2008 | Kelly et al. | |
| 7,387,759 B2 | 6/2008 | Kelly et al. | |
| 2007/0229758 A1 | 3/2007 | Matsuzawa | |
| 2007/0122540 A1 | 5/2007 | Salamone et al. | |
| 2008/0142038 A1 | 6/2008 | Kunzler et al. | |
| 2008/0152800 A1 | 6/2008 | Bothe et al. | |

(Continued)

FOREIGN PATENT DOCUMENTS

| | | | |
|---|---|---|---|
| WO | 00/71612 A1 | 11/2000 | |
| WO | WO-0071612 A1 * | 11/2000 | ............. A61L 27/34 |
| WO | 2004/058318 A1 | 7/2004 | |
| WO | 2014/095690 A1 | 6/2014 | |
| WO | 2016/032940 A1 | 3/2016 | |

OTHER PUBLICATIONS

R. Hartmann Plasma polymerisation: Grundlagen, Technik und Anwendung, Jahrbuch Oberflächentechnik Band (1993) 49, pp. 283-296, Battelle-Inst. e.V. Frankfurt/Main Germany.

H. Yasuda, "Glow Discharge Polymerization", Journal of Polymer Science: Macromolecular Reviews, vol. 16 (1981), pp. 199-293.

(Continued)

*Primary Examiner* — Travis S Fissel

(74) *Attorney, Agent, or Firm* — Jian Zhou

(57) ABSTRACT

The invention is related to a method for producing silicone hydrogel contact lenses with a stable lubricious hydrogel coating thereon providing a low surface friction. A method of the invention comprises forming a plasma-reactive hydrophilic polymer hybrid base coating having reactive functional groups on a silicone hydrogel contact lens and heating the silicone hydrogel contact lens with the hybrid base coating in an aqueous solution of a water-soluble and thermally crosslinkable hydrophilic polymeric material to form a stable lubricious hydrogel coating thereon.

16 Claims, No Drawings

(56) References Cited

U.S. PATENT DOCUMENTS

| | | |
|---|---|---|
| 2008/0174035 A1 | 7/2008 | Winterton |
| 2008/0226922 A1 | 9/2008 | Ferreiro et al. |
| 2009/0145086 A1 | 6/2009 | Reynolds et al. |
| 2009/0145091 A1 | 6/2009 | Connolly et al. |
| 2009/0186229 A1 | 7/2009 | Muller et al. |
| 2012/0026457 A1 | 2/2012 | Qiu et al. |
| 2012/0026458 A1 | 2/2012 | Qiu et al. |
| 2012/0314185 A1 | 12/2012 | Bauman et al. |
| 2013/0118127 A1 | 5/2013 | Kolluru et al. |
| 2013/0308093 A1* | 11/2013 | Qiu ............... C09D 133/26 351/159.33 |
| 2016/0061995 A1 | 8/2016 | Chang et al. |
| 2016/0326046 A1 | 11/2016 | Quinter et al. |
| 2017/0068018 A1 | 3/2017 | Qian et al. |
| 2017/0068019 A1 | 3/2017 | Qian et al. |
| 2017/0165932 A1 | 6/2017 | Qian et al. |
| 2018/0079157 A1 | 3/2018 | Tucker et al. |
| 2018/0079158 A1 | 3/2018 | Qiu et al. |
| 2018/0079889 A1 | 3/2018 | Chiang et al. |
| 2018/0081197 A1 | 3/2018 | Qiu et al. |
| 2018/0113236 A1 | 4/2018 | Bothe et al. |

OTHER PUBLICATIONS

O. Auciello et al. (ed.) "Plasma-Surface Interactions and Processing of Materials"; The Application of Plasmas to Thin Film Deposition Processes; Kluwer Academic Publishers, 1990, pp. 377-399.

N. Dilsiz and G. Akovali "Plasma Polymerization of Selected Organic Compounds", Polymer, vol. 37, No. 2, 1996, pp. 333-342.

Sebastain W. Schmidt et al., "Simple Coupling Chemistry Linking Carboxyl-Containing Organic Molecules to Silicon Oxide Surfaces Under Acidic Conditions", Langmuir Article, pubs. acs.org/Langmuir, 2010 American Chemical Society, Langmuir 2010, 26 (19), pp. 15333-15338.

J. Mort and F. Jansen, "Plasma Deposition Processes", in "Plasma Deposited Thin Films", CRC Press Boca Raton, Florida (1986), pp. 1-19.

Chung-Peng Ho and H. Yasuda, "Ultrathin Coating of Plasma Polymer of Methane Applied on the Surface of Silocone Contact Lenses"; Journal of Biomedical Materials Research, vol. 22, (1988), pp. 919-937.

Hubert Hody et al., "Optimization of Carboxyl Surface Functionalization by MA-VTMS Copolymerization Using Atmospheric Pressure Plasma DBD: Influence of the Carrier Gas", Plasma Processes and Polymers, 2010, 7, pp. 403-410.

V. B. Ivanov et al., "Determination of Functional Groups on Polymer Surfaces Using Fluorescence Labelling," Surface and Interface Anaylsis, vol. 24, (1996), pp. 257-262.

Stefan Rodiger et al., "Fluorescence Dye Adsorption Assay to Quantify Carboxyl Groups on the Surface of Poly(Methy Methacrylate) Microbeads", Analytical Chemistry, American Chemical Society, 2011, 83, pp. 3379-3385.

Robert D. Short and Daivd A. Steele, "Testing the Hypothesis: Comments on Plasma Polymerisation of Acrylic Acid Revisited," Plasma Processes and Polymers, 2010, vol. 7, pp. 366-370.

A. J. Beck et al., "Deposition of functional coatings from acrylic acid and octamethylcyclotetrasiloxane onto steel using an atmospheric pressure dielectric barrier discharge", Surface & Coatings Technology, 203, 2008, pp. 822-825.

* cited by examiner

METHOD FOR PRODUCING CONTACT LENSES WITH WEARING COMFORT

This application claims the benefit under 35 USC § 119 (e) of U.S. provisional application No. 62/414,902 filed 31 Oct. 2016, incorporated by reference in its entirety.

The present invention generally relates to a method for producing silicone hydrogel contact lenses having a stable lubricious coating providing a low surface friction. In addition, the present invention provides silicone hydrogel contact lenses produced according to the method of the invention.

BACKGROUND

Soft silicone hydrogel contact lenses are increasingly becoming popular because of their high oxygen permeability and comfort. But, a silicone hydrogel material typically has a surface, or at least some areas of its surface, which is hydrophobic (non-wettable) and susceptible to adsorbing lipids or proteins from the ocular environment and may adhere to the eye. Thus, a silicone hydrogel contact lens will generally require a surface modification.

A known approach for modifying the hydrophilicity of a relatively hydrophobic contact lens material is through the use of a plasma treatment, for example, commercial lenses such as Focus NIGHT & DAY™ and O2OPTIX™ (CIBA VISION), and PUREVISION™ (Bausch & Lomb) utilize this approach in their production processes. Advantages of a plasma coating, such as, e.g., those may be found with Focus NIGHT & DAY™, are its durability, relatively high hydrophilicity/wettability, and low susceptibility to lipid and protein deposition and adsorption. But, plasma treatment of silicone hydrogel contact lenses may not be cost effective, because the preformed contact lenses must typically be dried before plasma treatment and because of relative high capital investment associated with plasma treatment equipment. Further, plasma treatment may not provide a silicone hydrogel contact lens with a desirable surface lubricity.

Another approach for modifying the hydrophilicity of a relatively hydrophobic contact lens material is a layer-by-layer (LbL) polyionic material deposition technique (see for example, U.S. Pat. Nos. 6,451,871, 6,719,929, 6,793,973, 6,884,457, 6,896,926, 6,926,965, 6,940,580, and 7,297,725, and U.S. Patent Application Publication Nos. 2007/0229758A1, US 2008/0174035A1, and US 2008/0152800A1). Although the LbL deposition technique can provide a cost effective process for rendering a silicone hydrogel material wettable, LbL coatings may not be as durable as plasma coatings and may have relatively high densities of surface charges, in particular, negative surface charges; which may interfere with contact lens cleaning and disinfecting solutions due to their high susceptibility to deposition and accumulation of positively charged antimicrobials (e.g., polyhexamethylene biguanide, Polyquaternium-1®, or the like) commonly found in most multipurpose lens care solutions. Those positively charged antimicrobials adsorbed by the silicone hydrogel lenses may be released into the eye and may cause undesirable clinical symptoms in some persons, such as diffuse corneal staining and product intolerance, when the lenses are worn by patients. To improve the durability, crosslinking of LbL coatings on contact lenses has been proposed in commonly-owned copending US patent application publication Nos. 2008/0226922 A1 and 2009/0186229 A1 (incorporated by reference in their entireties). However, crosslinked LbL coatings may have a hydrophilicity and/or wettability inferior than original LbL coatings (prior to crosslinking) and still have relative high densities of negative surface charges.

US Patent Application Publication No. 2008/0142038A1 describes another approach for modifying the hydrophilicity of a relatively hydrophobic contact lens material. According to this approach, a preformed silicone hydrogel contact lens in unhydrated state is subjected to a oxidation plasma treatment in an atmosphere composed of a suitable media, such as, ammonia, an alkylamine, air, water, peroxide, oxygen gas, methanol, acetone, etc., in order to improve or promote adhesion for bonding of the subsequent carboxylic acid-containing polymeric or copolymeric layer; then the plasma-treated lens is extracted in an organic solvent (e.g., isopropanol), rehydrated in water, and packaged in a polypropylene blister pack containing a coating solution of a polyanionic polymer (e.g., polyacrylic acid); and finally the packaged lens is sterilized in steam in an autoclave at a temperature up to and including 100° C. This approach would still have the above-described shortcomings for the LbL-approach, such as, high susceptibility to deposition and accumulation of positively charged antimicrobials in a lens care solution and insufficient durability.

U.S. Pat. No. 6,630,243 disclose another approach for modifying the hydrophilicity of a relatively hydrophobic contact lens material. According to this approach, a preformed silicone hydrogel contact lens in unhydrated state is subjected to plasma polymerization in a hydrocarbon-containing atmosphere to form a polymeric carbonaceous layer on the lens surface; reactive functionalities are then generated on the surface of the carbonaceous layer; and finally a hydrophilic reactive polymer is covalently attached to the surface of the carbonaceous layer through the surface reactive functionalities of the carbonaceous layer. This approach may not provide a silicone hydrogel contact lens with a desirable surface lubricity.

A still further approach for modifying the hydrophilicity of a relatively hydrophobic contact lens material is to attach hydrophilic polymers onto contact lenses according to various mechanisms (see for example, U.S. Pat. Nos. 6,099,122, 6,436,481, 6,440,571, 6,447,920, 6,465,056, 6,521,352, 6,586,038, 6,623,747, 6,730,366, 6,734,321, 6,835,410, 6,878,399, 6,923,978, 6,440,571, and 6,500,481, US Patent Application Publication Nos. 2009/0145086 A1, 2009/0145091A1, 2008/0142038A1, and 2007/0122540A1, all of which are herein incorporated by reference in their entireties). Although those techniques can be used in rendering a silicone hydrogel material wettable, they may not be cost-effective and/or time-efficient for implementation in a mass production environment, because they typically require relatively long time and/or involve laborious, multiple steps to obtain a hydrophilic coating.

Recently, a new cost-effective approach has been described in U.S. pat. Appl. pub. No. 2012/0026457 A1 (herein incorporated by reference in its entirety) for applying a non-silicone hydrogel coating onto a silicone hydrogel contact lens, in which an organic solvent-based coating solution of a polyanionic polymer is involved in forming an interpenetrating base coating (i.e., an anchoring layer) on a silicone hydrogel contact lens and then a partially-crosslinked hydrophilic polymeric material is covalently attached onto the anchoring layer directly in a lens package during autoclave. Although silicone hydrogel contact lenses produced according to such an approach can have a water-gradient structural configuration and a soft and lubricious surface, they may be susceptible to high deposition and accumulation of positively charged antimicrobials commonly found in most multipurpose lens care solutions, due to the presence of the anchoring layer of a polyanionic material.

Therefore, there is still a need for an improved method for producing silicone hydrogel contact lenses with a durable, lubricious non-silicone hydrogel coating which has a minimized susceptibility to high deposition and accumulation of positively charged antimicrobials and which has a low surface friction to result in improved wearing comfort. There is also a need for silicone hydrogel contact lenses with such a durable coating thereon.

SUMMARY OF THE INVENTION

The invention, in one aspect, provides a method for producing soft contact lenses, the method of invention comprising the steps of: (1) obtaining a preformed silicone hydrogel contact lens in a dry state; (2) subjecting the preformed silicone hydrogel contact lens in the dry state to a surface treatment to obtain a silicone hydrogel contact lens with a base coating thereon, wherein the base coating comprises a prime plasma layer, a reactive polymer layer on top of the prime plasma layer, and reactive functional groups selected from the group consisting of carboxyl groups, primary amino groups, secondary amino groups, and combinations thereof, wherein the surface treatment comprises the sub-steps of (a) plasma-treating the surface of the preformed silicone hydrogel contact lens in the dry state with a plasma to obtain a silicone hydrogel contact lens with the prime plasma layer thereon, wherein the plasma is generated in a plasma gas (i.e., an atmosphere) composed of a mixture of an unsaturated $C_2$-$C_4$ hydrocarbon and $CO_2$, wherein the prime plasma layer has a thickness of from about 0.5 nm to about 40 nm, and (b) contacting the silicone hydrogel contact lens with the prime plasma layer thereon with a first aqueous solution including a reactive hydrophilic polymer having multiple reactive functional groups selected from the group consisting of carboxyl groups, primary amino groups, secondary amino groups, and combinations thereof to form the base coating which include the reactive polymer layer of the reactive hydrophilic polymer on top of the prime plasma layer; and (3) heating the silicone hydrogel contact lens with the base coating thereon obtained in step (2), in a second aqueous solution which comprises a water-soluble and thermally-crosslinkable hydrophilic polymeric material having azetidinium groups and optionally (but preferably) primary or secondary amino groups and/or carboxyl groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the hydrogel coating on the silicone hydrogel contact lens in fully hydrated state has a WBUT of at least about 10 seconds and a friction rating of about 3 or lower.

In another aspect, the invention provides a silicone hydrogel contact lens obtained according to a method of the invention, wherein the silicone hydrogel contact lens has an oxygen permeability of at least about 40 barrers, a water contact angle of less than 80 degrees, a WBUT of at least about 10 seconds, a friction rating of about 3 or lower, and a coating durability characterized by surviving at least 7 cycles of digital rubbing test.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material.

A "soft contact lens" refers to a contact lens which has an elastic modulus (i.e., Young's modulus) of less than 2.5 MPa.

A "hydrogel" or "hydrogel material" refers to a crosslinked polymeric material which has three-dimensional polymer networks (i.e., polymer matrix), is insoluble in water, but can hold at least 10 percent by weight of water in its polymer matrix when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

"Surface hydrophilicity", as used herein, describes a surface property that represents the extent to which a surface interacts with water, as measured by water-break-up-time (WBUT). The higher the value of WBUT is, the higher the surface hydrophilicity is.

In accordance with the invention, the "surface lubricity" of a contact lens (or a medical device) is measured by a friction rating which is a number from 0 to 4. The higher the value of friction rating is, the lower the surface lubricity is.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.1% by weight at room temperature (i.e., a temperature of about 22° C. to about 28° C.).

The term "insoluble", in reference to a compound or material in a solvent, means that the compound or material can be dissolved in the solvent to give a solution with a concentration of less than 0.005% by weight at room temperature (as defined above).

As used in this application, the term "ethylenically unsaturated group" is employed herein in a broad sense and is intended to encompass any groups containing at least one >C=C< group. Exemplary ethylenically unsaturated groups include without limitation (meth)acryloyl

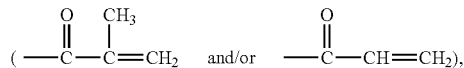

allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "macromer" or "prepolymer" refers to a compound or polymer that contains ethylenically unsaturated groups and has an average molecular weight of greater than 700 Daltons.

As used in this application, the term "vinylic crosslinker" refers to a compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the weight-average molecular weight unless otherwise specifically noted or unless testing conditions indicate otherwise.

A "polysiloxane" refers to a compound containing a polysiloxane segment of

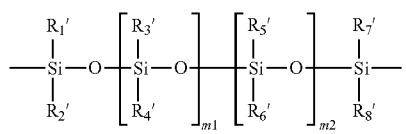

in which m1 and m2 independently of each other are an integer of from 0 to 500 and (m1+m2) is from 2 to 500, $R_1'$, $R_2'$, $R_3'$, $R_4'$, $R_5'$, $R_6'$, $R_7'$, and $R_8'$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{m3}$—OR' (in which alk is $C_1$-$C_6$ alkyl diradical, a is H or $C_1$-$C_4$ alkyl and m3 is an integer from 1 to 10), or a linear hydrophilic polymer chain.

A "polycarbosiloxane" refers to a compound containing a polycarbosiloxane segment of

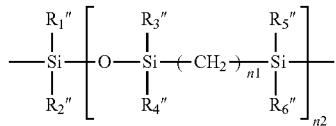

in which n1 is an integer of 2 or 3, n2 is an integer of from 2 to 100 (preferably from 2 to 20, more preferably from 2 to 10, even more preferably from 2 to 6), $R_1''$, $R_2''$, $R_3''$, $R_4''$, $R_5''$, and $R_6''$ independent of one another are a $C_1$-$C_6$ alkyl radical (preferably methyl).

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "oxazoline" refers to a compound of

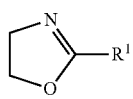

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR' in which alk is $C_1$-$C_4$ alkyl diradical; R" is $C_1$-$C_4$ alkyl (preferably methyl); and m3 is an integer from 1 to 10 (preferably 1 to 5).

In this application, the term "polyoxazoline" refers to a linear polymer having a formula of

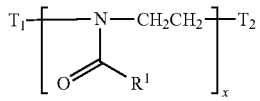

in which: T1 and T2 are two terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

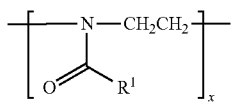

in which $R^1$ and x are as defined above.

In this application, the term "poly(2-oxazoline-co-ethyleneimine)" refers to a statistical copolymer having a formula of

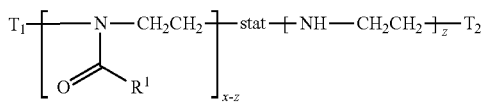

in which: T1 and T2 are terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly(2-oxazoline-co-ethyleneimine)-epichlorohydrin are disclosed in U.S. pat. Appl. pub. No. 2016/0061995 A1 (herein incorporated by reference in its entirety).

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged, divalent radical (or group or moiety) of

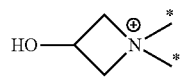

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extent detectable for a period of about one hour.

The term "azlactone" refers to a mono-valent radical of formula

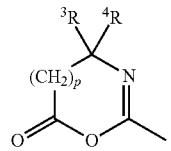

in which p is 0 or 1; $^3R$ and $^4R$ independently of each other is $C_1$-$C_8$ alkyl (preferably methyl).

As used in this application, the term "phosphorylcholine" refers to a monovalent zwitterionic group of

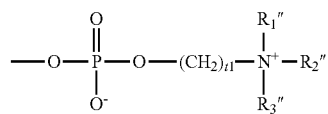

in which t1 is an integer of 1 to 5 and $R_1"$, $R_2"$ and $R_3"$ independently of one another are $C_1$-$C_8$ alkyl or $C_1$-$C_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially project a beam of radiation (e.g., UV radiation) having a cross-sectional profile defined by the projection contour of the mask or screen. The projected beam of radiation (e.g., UV radiation) limits radiation (e.g., UV radiation) impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

A "water contact angle" refers to an average water contact angle (i.e., contact angles measured by Sessile Drop method) at the room temperature, which is obtained by averaging measurements of contact angles with at least 3 individual contact lenses.

The term "intactness" in reference to a coating on a silicone hydrogel contact lens is intended to describe the extent to which the contact lens can be stained by Sudan Black in a Sudan Black staining test described in Example 1. Good intactness of the coating on a silicone hydrogel contact lens means that there is practically no Sudan Black staining of the contact lens.

The term "durability" in reference to a coating on a silicone hydrogel contact lens is intended to describe that the coating on the silicone hydrogel contact lens can survive a desired number of cycles of digital rubbing tests.

As used herein, "surviving a number ("j") of cycles of digital rubbing tests" in reference to a coating on a contact lens means that after j cycles of digitally rubbing tests according to the procedure described in Example 1, the contact lens has a digital-rubbing-induced reduction in WBUT after j cycles of digital rubbing tests, $\Delta WBUT_{DR}(j)$, of about 45% or less (preferably about 35% or less, more preferably about 25% or less, even more preferably about 15% or less) and optionally a digital-rubbing-induced increase in friction rating after j cycles of digital rubbing tests, $\Delta FR_{DR}(j)$, of about 60% or less (preferably about 50% or less, more preferably about 40% or less, even more preferably about 30% or less), wherein $$\Delta WBUT_{DR}(j) = \frac{WBUT_{ODR} - WBUT_{jDR}}{WBUT_{ODR}} \times 100\% \text{ and } \Delta FR_{DR}(j) = \frac{FR_{jDR} - FR_{ODR}}{4} \times 100\%$$

in which $WBUT_{ODR}$ and $FR_{ODR}$ are the WBUT and the friction rating of the contact lens which is in fully-hydrated state and is subjected to zero digital rubbing test, and $WBUT_{jDR}$ and $FR_{jDR}$ are the WBUT and the friction rating of the contact lens which is in fully hydrated state and has been subjected to at least j cycles of digital rubbing tests, wherein j is an integer of 2 (preferably 7, more preferably 14, even more preferably 30).

The term "one cycle of digital rubbing test" means that contact lenses (or medical devices) with a coating thereon are digitally rubbed (wearing disposable powder-free latex gloves) with RENU® multi-purpose lens care solution (or another multi-purpose lens care solution) for 20 seconds and then rinsed with saline. The above procedure can be repeated for a given times, e.g., from 2 to 30 times and number of repetitions of digital rubbing tests is the number of cycles of digital rubbing tests.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures described in Example 1 of 2012/0026457 A1 (herein incorporated by reference in its entirety). Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

The "ion permeability" through a lens correlates with the Ionoflux Diffusion Coefficient. The Ionoflux Diffusion Coefficient, D (in units of [mm²/min]), is determined by applying Fick's law as follows:

$$D = -n'/(A \times dc/dx)$$

where n'=rate of ion transport [mol/min]; A=area of lens exposed [mm²]; dc=concentration difference [mol/L]; dx=thickness of lens [mm].

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

An "aqueous solution" or a "water-based solution" interchangeably refers to a solution which is a homogeneous mixture consisting of a water-based solvent and one or more solutes dissolved in the water-based solvent. A "water-based solvent" is intended to describe a solvent system which consists of at least 50% (preferably at least about 60%, more preferably at least about 80%, even more preferably at least about 90%, in particular at least about 95%) by weight of water and at most 50% (preferably about 40% or less, more preferably about 20% or less, even more preferably about 10% or less, in particular about 5% or less) by weight of one or more organic solvents relative to the weight of the solvent system. An aqueous coating solution refers to an aqueous solution containing at least one polymeric coating material as a solute in the solution.

An "organic-based solution" refers to a solution which is a homogeneous mixture consisting of an organic-based solvent and one or more solutes dissolved in the organic based solvent. An "organic-based solvent" is intended to describe a solvent system which consists of one or more organic solvents and less than 49%, preferably about 40% or less, more preferably about 20% or less, even more preferably about 10% or less, in particular about 5% or less by weight of water relative to the weight of the solvent system. An organic-based coating solution refers to an organic-based solution containing at least one polymeric coating material as a solute in the solution.

In this application, the term "quenching" in reference to a plasma-treated silicone hydrogel contact lens refers to a process in which the plasma-treated silicone hydrogel contact lens (still in a dry state) is in contact with (e.g., being immersed in or sprayed with) any liquid at the first time within about 40 minutes or less immediately after the plasma treatment.

The invention is generally related to a method for producing silicone hydrogel contact lenses with a non-silicone hydrogel coating thereon, wherein the resultant non-silicone hydrogel coating has a WBUT of at least 10 seconds (preferably at least about 12.5 seconds, more preferably at least about 15 seconds, even more preferably at least about 17.5 seconds) and a friction rating of about 3 or lower (preferably about 2.5 or lower, more preferably about 2 or lower, even more preferably about 1.5 or lower, most preferably about 1 or lower).

The invention, in one aspect, provides a method for producing soft contact lenses, the method of invention comprising the steps of:
(1) obtaining a preformed silicone hydrogel contact lens in a dry state;
(2) subjecting the preformed silicone hydrogel contact lens in the dry state to a surface treatment to obtain a silicone hydrogel contact lens with a base coating thereon, wherein the base coating comprises a prime plasma layer, a reactive polymer layer on top of the prime plasma layer, and reactive functional groups selected from the group consisting of carboxyl groups, primary amino groups, secondary amino groups, and combinations thereof, wherein the surface treatment comprises the sub-steps of
  (a) plasma-treating the surface of the preformed silicone hydrogel contact lens in the dry state with a plasma to obtain a silicone hydrogel contact lens with the prime plasma layer thereon, wherein the plasma is generated in a plasma gas (i.e., an atmosphere) composed of a mixture of an unsaturated $C_2$-$C_4$ hydrocarbon (preferably ethylene) and $CO_2$, wherein the prime plasma layer has a thickness of from about 0.5 nm to about 40 nm (preferably from about 1 nm to about 35 nm, more preferably from about 2 nm to about 30 nm, even more preferably from about 3 nm to about 25 nm), and
  (b) contacting the silicone hydrogel contact lens with the prime plasma layer thereon with a first aqueous solution including a reactive hydrophilic polymer having multiple reactive functional groups selected from the group consisting of carboxyl groups, primary amino groups, secondary amino groups, and combinations thereof to form the base coating which include the reactive polymer layer of the reactive hydrophilic polymer on top of the prime plasma layer; and
(3) heating the silicone hydrogel contact lens with the base coating thereon obtained in step (2), in a second aqueous solution which comprises a water-soluble and thermally-crosslinkable hydrophilic polymeric material having azetidinium groups and optionally (but preferably) primary or secondary amino groups and/or carboxyl groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the hydrogel coating on the silicone hydrogel contact lens in fully hydrated state has a WBUT of at least about 10 seconds (preferably at least about 12.5 seconds, more preferably at least about 15 seconds, even more preferably at least about 17.5 seconds) and a friction rating of about 3 or lower (preferably about 2.5 or lower, more preferably about 2 or lower, even more preferably about 1.5 or lower, most preferably about 1 or lower).

In accordance with the invention, a preformed silicone hydrogel contact lens is any silicone hydrogel contact lens which has not been subjected to any surface treatment after being produced according to any lens manufacturing processes. A person skilled in the art knows very well how to make preformed silicone hydrogel (SiHy) contact lenses. For example, SiHy contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of silicone hydrogel buttons as used in making customized contact lenses. In cast-molding, a lens formulation typically is dispensed into molds and cured (i.e., polymerized and/or crosslinked) in molds for making contact lenses. For production of silicone hydrogel (SiHy) contact lenses, a SiHy lens-forming composition (or SiHy lens formulation) for cast-molding or spin-cast molding or for making SiHy rods used in lathe-cutting of contact lenses generally comprises at least one component selected from the group consisting of a silicone-containing vinylic monomer, a silicone-containing vinylic macromer, a silicone-containing prepolymer, a hydrophilic vinylic monomer, a hydrophobic vinylic monomer, a vinylic crosslinking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other desirable components known to a person skilled in the art, such as, for example, a UV-absorbing agent (i.e., UV-absorbing vinylic monomers), a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored pattern printed thereon as well known to a person skilled in the art).

All the components discussed above in a SiHy lens formulation are well known to a person skilled in the art as evidenced by the fact that numerous SiHy lens formulations have been described in numerous patents and patent applications published by the filing date of this application. All of them can be used in obtaining a preformed SiHy lens in the invention. A SiHy lens formulation for making commercial SiHy lenses, such as, lotrafilcon A, lotrafilcon B, delefilcon A, balafilcon A, galyfilcon A, senofilcon A, narafilcon A, narafilcon B, comfilcon A, enfilcon A, asmofilcon A, somofilcon A, stenfilcon A, smafilcon A, enfilcon A, and efrofilcon A can also be used in making preformed SiHy contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. Pat. Nos. 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, the SiHy lens formulation can be introduced (dispensed) into a cavity formed by a mold according to any known methods.

After the SiHy lens formulation is dispensed into the mold, it is polymerized to produce a preformed contact lens. Crosslinking may be initiated thermally or actinically, preferably by exposing the lens-forming composition in the mold to a spatial limitation of actinic radiation to crosslink the polymerizable components in the SiHy lens formulation.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvents are those described above.

A preformed silicone hydrogel contact lens can be dried according to any method known to a person skilled in the art and then be subjected to plasma-treatment by exposing it to a plasma (also referred to as "electrical glow discharge plasma"). Examples of plasma treatment are those disclosed in U.S. Pat. Nos. 4,143,949; 4,312,575; 5,464,667, 6,881,269; and 7,078,074 (herein incorporated by references in their entireties)

A person skilled in the art understands well that a plasma (i.e., electrical glow discharge plasma) is a partially ionized gas which consists of large concentrations of excited atomic, molecular, ionic, and free-radical species and which is generated subjecting a gas in a vacuum chamber to an electric field, typically at radio frequency (rf) (or at a microwave or other frequency). The excited species interact with solid surfaces of an article placed in the plasma, resulting in the chemical and physical modification of the material surface.

For a review of plasma treatment and its uses reference is made to R. Hartmann "Plasma polymerisation: Grundlagen, Technik and Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341.

As an illustrated example of plasma treatment of silicone hydrogel contact lenses, one or more preformed silicone hydrogel contact lenses are placed in a reactor chamber between opposing electrodes. The chamber is then sealed and depressurized by a vacuum system. Significant time is required to pump the system to the operative pressure. When a suitable pressure is achieved in the chamber, a process gas (i.e., a plasma gas) is introduced into the chamber interior, and the electrodes are energized. The resulting plasma cloud may apply a thin layer of polymer (or a polymer coating) to the lens and/or change the chemical composition of a top layer of the lens surface depending upon the process gas used. After an appropriate time, the electrodes are de-energized, and the reactor chamber is brought back to atmospheric pressure so that the lenses may be removed.

Plasma treatment systems are known to a person skilled in the art and have been disclosed in patents and articles. For example, Peng Ho and Yasuda describe, in their paper ("Ultrathin Coating Of Plasma Polymer Of Methane Applied On The Surface Of Silicone Contact Lenses," Journal of Biomedical Materials Research, Vol. 22, 919-937 (1988), herein incorporated by reference in its entirety), a batch system (or a rotary plasma system) including a bell-shaped vacuum chamber in which opposing aluminum electrodes are disposed and a rotatable aluminum plate sits between the electrodes and is driven by an induction motor within the system. Matsuzawa and Winterton disclose in U.S. Pat. No. 6,881,269 (herein incorporated by reference in its entirety) a linear plasma system.

In accordance with the invention, the preformed silicone hydrogel contact lens in a dried state is treated with a plasma generated in a plasma gas (i.e., an atmosphere) composed of a mixture of an unsaturated $C_2$-$C_4$ hydrocarbon and $CO_2$, preferably a mixture of ethylene and $CO_2$.

In accordance with the invention, the thickness of a prime plasma layer is from about 0.5 nm to about 40 nm, preferably from about 1 nm to about 35 nm, more preferably from about 2 nm to about 30 nm, even more preferably from about 3 nm to about 25 nm. A plasma coating with a thickness recited above can have minimally adverse impacts upon the oxygen permeability and ion permeability of a silicone hydrogel contact lens. The thickness of a plasma coating (layer) can be determined according to any know method. For example, it can be measured by ellipsometery on silicon wafers which are plasma-treated together with preformed silicone hydrogel contact lenses. A person knows how to control the plasma conditions (especially plasma treatment time) for obtaining a desired thickness of a particular prime plasma layer on a silicone hydrogel contact lens.

Where a plasma used in plasma treatment is generated in an atmosphere (i.e., plasma gas) composed of a mixture of an unsaturated $C_2$-$C_4$ hydrocarbon and $CO_2$ the composition of a plasma gas can be controlled by the flow rates (sccm) of each individual gases in the mixture. Preferably, the flow rate ratio of an unsaturated $C_2$-$C_4$ hydrocarbon over the $CO_2$ is from about 1:4 to about 4:1.

In accordance with the invention, contacting of a plasma-treated silicone hydrogel contact lens with a first aqueous solution of a reactive hydrophilic polymer can occur by dipping it into the aqueous solution or by spraying it with the aqueous solution. One contacting process involves solely dipping the plasma-treated silicone hydrogel contact lens in a bath of a first aqueous solution for a period of time or alternatively dipping the plasma-treated silicone hydrogel contact lens sequentially in a series of baths of aqueous solutions for a fixed shorter time period for each bath. Another contacting process involves solely spray a first aqueous solution. However, a number of alternatives involving various combinations of spraying- and dipping-steps may be designed by a person having ordinary skill in the art. The contacting time can be from about 5 seconds to about 10 hours. A person knows how to control the contacting time for obtaining a desired thickness of a particular reactive polymer layer on a silicone hydrogel contact lens with a prime plasma layer thereon.

In a preferred embodiment, after being removed from the plasma treatment system, silicone hydrogel contact lenses are placed in contact with a first aqueous solution including a reactive hydrophilic polymer having multiple reactive functional groups selected from the group consisting of carboxyl groups, primary amine groups, secondary amine groups, and combinations thereof, within a time period of about 40 minutes or less (preferably about 30 minutes or less, more preferably about 20 minutes or less) immediately after the plasma-treatment sub-step and before contacting with water, an organic solvent, a mixture of water and one or more organic solvents, a mixture of two or more organic solvent, or any aqueous or organic-based solution free of any polymer. It is believed that there may be reactive radicals in a prime plasma layer on the surface of a plasma-treated silicone hydrogel contact lens. When a reactive polymer is present in a first aqueous solution for contacting a plasma-treated silicone hydrogel contact lens within 40 minutes immediately after plasma treatment, those free radicals may react with the reactive polymer to provide sufficient anchoring sites for covalently attaching a layer of the reactive polymer on the prime plasma layer, thereby enhancing the durability of the hydrogel coating to be formed in step (3). Preferably, the first aqueous solution comprises at least about 0.001% by weight (preferably from about 0.002% to about 20% by weight, more preferably from about 0.005% to about 15% by weight, even more preferably from about 0.01% to about 10% by weight) of a reactive hydrophilic polymer as defined above. Preferably, the reactive hydrophilic polymer comprises carboxyl groups.

It is found that a reactive base coating comprising a prime plasma layer and a reactive polymer layer can be advantageously used for forming a lubricious non-silicone hydrogel coating on a silicone hydrogel contact lens. Such a lubricious non-silicone hydrogel coating may have low susceptibility to deposition and accumulation of positively charged antimicrobials because of minimized concentration of carboxyl groups in the base coating. Further, the underlying prime plasma layer may provide the adequate hydrophilicity (or wettability) of the silicone hydrogel contact lens sufficient for ensuring its biocompatibility, even though it is not lubricious, in case if the non-silicone hydrogel coating would be damaged during the handling and wearing of the contact lens. In addition, this surface treatment may provide a platform for building a lubricious coating having a desired durability, e.g., lasting up to two days for daily-disposable lenses, lasting 7 to 35 days for weekly, biweekly or monthly disposable lenses.

In another preferred embodiment, the reactive hydrophilic polymer is a polyanionic polymer comprising carboxyl groups and having a weight average molecular weight of at least 1000 Daltons (preferably from 2000 to 5,000,000 Daltons, more preferably from 5000 to 2,000,000 Daltons, even more preferably from 10,000 to 1,000,000 Daltons), and the first aqueous solution preferably has a pH from about 1.0 to about 3.0 (more preferably from about 1.5 to about 2.5, even more preferably from about 1.8 to about 2.0). The polyanionic polymer is preferably a polyanionic polymer selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof, more preferably a polyanionic polymer selected from the group consisting of polyacrylic acid, polymethacrylic acid, poly(acrylic acid-co-methacrylic acid), and a mixture thereof. It is believed that there may be some reactive functional groups including silanol groups (Si—

OH) in the prime plasma layer on the surface of a plasma-treated silicone hydrogel contact lens. Schmidt reported that coupling reactions can occur between a carboxyl group and a free, unreacted silanol group at low pH (e.g., pH 2.0) according to an acid-catalyzed ester condensation mechanism (S. W. Schmidt, et al., Langmuir 2010, 26(19), 15333-15338, herein incorporated by reference in its entirety).

In another preferred embodiment, the reactive hydrophilic polymer is a polycationic polymer comprising primary and/or secondary amino groups and having a weight average molecular weight of at least 1000 Daltons (preferably from 2000 to 5,000,000 Daltons, more preferably from 5000 to 2,000,000 Daltons, even more preferably from 10,000 to 1,000,000 Daltons) and the first aqueous solution preferably has a pH from about 9.5 to about 11.0 (more preferably from about 10.0 to about 11.0). The polycationic polymer is preferably selected from the group consisting of polyethyleneimine, polyallylamine, polyvinylamine, polyamidoamine, and a mixture thereof.

In another preferred embodiment, the preformed silicone hydrogel contact lens is plasma-treated with a plasma generated in a plasma gas (i.e., an atmosphere) composed of a mixture of $CO_2$ and an unsaturated $C_2$-$C_4$ hydrocarbon (preferably ethylene), followed by, optionally, contacting the plasma-treated silicone hydrogel contact lens with a first aqueous solution of a reactive hydrophilic polymer comprising azetidinium groups and reactive functional groups selected from the group consisting of primary groups, secondary amino groups, carboxyl groups, and combinations thereof (preferably carboxyl groups), wherein the hydrophilic polymer has a weight average molecular weight of at least 1000 Daltons (preferably from 2000 to 5,000,000 Daltons, more preferably from 5000 to 2,000,000 Daltons, even more preferably from 10,000 to 1,000,000 Daltons) and the first aqueous solution preferably has a pH of less than about 8.0 (more preferably from about 2.0 to about 8.0, even more preferably from about 6.0 to about 8.0). In this preferred embodiment, the reactive hydrophilic polymer is preferably a chemically-modified poly(2-oxazoline-co-ethyleneimine)-epichlorohydrin, a chemically-modified polyamidoamine-epichlorohydrin, or combinations thereof. Preferably, the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof (preferably carboxyl groups), wherein the hydrophilic moieties or second polymer chains are covalently attached to the first polymer chains through one or more covalent linkages each formed between one azetidinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. The composition of a chemically-modified poly(2-oxazoline-co-ethyleneimine)-epichlorohydrin or a chemically-modified polyamidoamine-epichlorohydrin is determined by the composition (based on the total weight of the reactants) of a reactants mixture used for such a polymer according to the crosslinking reactions shown in Scheme I Scheme I

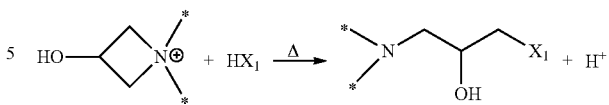

in which $X_1$ is —S—*, —OC(=O)—*, or —NR'—* in which R' is hydrogen or a $C_1$-$C_{20}$ unsubstituted or substituted alkyl group, and * represents an organic radical. For example, if a reactant mixture comprises about 75% by weight of a polyamidoamine-epichlorohydrin and about 25% by weight of at least one hydrophilicity-enhancing agent based on the total weight of the reactants, then the resultant chemically-modified polyamidoamine-epichlorohydrin comprises about 75% by weight of first polymer chains derived from the polyamioamine-epichlorohydrin and about 25% by weight of hydrophilic moieties or second polymer chains derived from said at least one hydrophilicity-enhancing agent. The azetidinium groups of the chemically-modified poly(2-oxazoline-co-ethyleneimine)-epichlorohydrin or the chemically-modified polyamidoamine-epichlorohydrin are those azetidinium groups (of the polyamidoamine-epichlorohydrin) which do not participate in crosslinking reactions for preparing the chemically-modified poly(2-oxazoline-co-ethyleneimine)-epichlorohydrin or the chemically-modified polyamidoamine-epichlorohydrin.

Any suitable hydrophilicity-enhancing agents can be used in the invention so long as they contain at least one amino group, at least one carboxyl group, and/or at least one thiol group.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$] in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NS CO_2H$)—), or combinations thereof.

Another preferred class of hydrophilic polymers as hydrophilicity-enhancing agents include without limitation: poly(ethylene glycol) (PEG) with mono-amino (primary or secondary amino), carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino- (primary or secondary) or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof. Reactive vinylic monomer(s) and non-reactive hydrophilic vinylic monomer(s) are those described previously.

More preferably, a hydrophilic polymer as a hydrophilicity-enhancing agent is PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acryamide (AAm), N,N-dimethylacrylamide (DMA), N-vinylpyrrolidone (NVP), N-vinyl-N-methyl acetamide, glycerol (meth)acrylate, hydroxyethyl (meth)acrylate, N-hydroxyethyl (meth)acrylamide, C$_1$-C$_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (meth)acrylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of acrylic acid, C$_1$-C$_3$ alkylacrylic acid, allylamine and/or amino-C$_2$-C$_4$ alkyl (meth)acrylate, and (2) at least one non-reactive hydrophilic vinylic monomer selected from the group consisting of acryamide, N,N-dimethylacrylamide, N-vinyl pyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, C$_1$-C$_4$-alkoxy polyethylene glycol (meth)acrylate having a weight average molecular weight of up to 400 Daltons, vinyl alcohol, and combination thereof.

Most preferably, the hydrophilicity-enhancing agent is PEG-NH$_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP] with from about 0.1% to about 30%, preferably from about 0.5% to about 20%, more preferably from about 1% to about 15%, by weight of (meth)acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of acrylic acid, C$_1$-C$_3$ alkylacrylic acid, allylamine and/or amino-C$_2$-C$_4$alkyl (meth)acrylate; and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionaly other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or copolymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

As used herein, a copolymer of a non-reactive hydrophilic vinylic monomer refers to a polymerization product of a non-reactive hydrophilic vinylic monomer with one or more additional vinylic monomers. Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOF Corporation (e.g., LIPIDURE®-A and -AF).

The weight average molecular weight $M_w$ of the hydrophilic polymer having at least one amino, carboxyl or thiol group (as a hydrophilicity-enhancing agent) is preferably from about 500 to about 1,000,000, more preferably from about 1,000 to about 500,000, even more preferably from about 5,000 to about 250,000 Daltons.

In accordance with the invention, the reaction between a hydrophilicity-enhancing agent and a poly(2-oxazoline-co-ethyleneimine)-epichlorohydrin copolymer (or a polyamidoamine-epichlorohydrin) is carried out at a temperature of from about 40° C. to about 80° C. for a period of time sufficient (from about 0.3 hour to about 24 hours, preferably from about 1 hour to about 12 hours, even more preferably from about 2 hours to about 8 hours) to form a chemically-modified poly(2-oxazoline-co-ethyleneimine)-epichlorohydrin or a chemically-modified polyamidoamine-epichlorohydrin.

In accordance with the invention, the concentration of a hydrophilicity-enhancing agent relative to a poly(2-oxazoline-co-ethyleneimine)-epichlorohydrin or a polyamidoamine-epichlorohydrin must be selected not to render a resultant hydrophilic polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the poly(2-oxazoline-co-ethyleneimine)-epichlorohydrin or a polyamidoamine-epichlorohydrin.

In a preferred embodiment, a chemically-modified poly (2-oxazoline-co-ethyleneimine)-epichlorohydrin or a chemically-modified polyamidoamine-epichlorohydrin comprises: azetidinium groups; from about 20% to about 95%, preferably from about 35% to about 90%, more preferably from about 50% to about 85%, by weight of first polymer chains derived from a poly(2-oxazoline-co-ethyleneimine)-epichlorohydrin copolymer or a polyamidoamine-epichlorohydrin; and from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of primary amino group, secondary amino group, carboxyl group, thiol group, and combination thereof.

In accordance with the invention, the silicone hydrogel contact lens with the base coating thereon is heated in a second aqueous solution which comprises a water-soluble and thermally-crosslinkable hydrophilic polymeric material having azetidinium groups and optionally (but preferably) amino or carboxyl groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the hydrogel coating on the silicone hydrogel contact lens has a friction rating of 2 or less. It should be understood that the first aqueous solution and the second aqueous solution can be identical to or different from each other. A water-soluble and thermally-crosslinkable hydrophilic polymeric material used in step (3) is preferably a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetidinium group of the polyamidoamine-epichlorohydrin or the poly (2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. A water-soluble thermally crosslinkable hydrophilic polymeric material can have all of the embodiments and preferred embodiments of a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, as described above for step (2)(b).

Preferably, the step of heating is performed by autoclaving the silicone hydrogel contact lens with a base coating thereon immersed in a packaging solution (i.e., a buffered aqueous solution) in a sealed lens package at a temperature of from about 115° C. to about 125° C. for approximately 20-90 minutes. In accordance with this embodiment of the invention, the packaging solution is a buffered aqueous solution which is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N, N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. Preferably, the buffering agents are phosphate buffers, borate buffers, or combinations thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

In another aspect, the invention provides a silicone hydrogel contact lens, which comprises: a silicone hydrogel substrate; a base coating on the surface of the silicone hydrogel substrate; a non-silicone hydrogel coating covalently attached onto the base coating, wherein the base coating comprises a prime plasma layer and a reactive polymer layer on top of the prime plasma layer, wherein the plasma prime layer has a thickness of from about 0.5 nm to about 40 nm (preferably from about 1 nm to about 35 nm, more preferably from about 2 nm to about 30 nm, even more preferably from about 3 nm to about 25 nm), wherein the reactive polymer comprises reactive functional groups selected from the group consisting of carboxyl groups, primary amino groups, secondary amino groups, and combinations thereof (preferably carboxyl groups), wherein the non-silicone hydrogel coating is covalently attached onto the reactive polymer layer through multiple reactive functional groups, wherein the silicone hydrogel contact lens in a fully-hydrated state has an oxygen permeability of at least about 40 barrers (preferably at least about 60 barrers, more preferably at least about 80 barrers, even more preferably at least about 100 barrers), a WBUT of at least about 10 seconds (preferably at least about 12.5 seconds, more preferably at least about 15 seconds, even more preferably at least about 17.5 seconds), a friction rating of about 3 or lower (preferably about 2.5 or lower, more preferably about 2 or lower, even more preferably about 1.5 or lower, most preferably about 1 or lower), and a water contact angle of about 80 degrees or less (preferably about 70 degrees or less, more preferably about 60 degrees or less, even more preferably about 50 degrees or less).

A silicone hydrogel contact lens of the invention, in a fully hydrated state, further has at least one property selected from the group consisting of: an elastic modulus of about 1.5 MPa or less (preferably from about 0.1 MPa to about 1.2 MPa or less, more preferably from about 0.15 MPa to about 1.1 or less, even more preferably from about 0.2 MPa to about 1.0 MPa); a water content of from about 15% to about 70%, preferably from about 20% to about 65%, more preferably from about 25% to about 60%, even more preferably from about 30% to about 55% by weight when fully hydrated; a coating durability characterized by surviving at least one cycle (preferably at least 7 cycles, more preferably at least 14 cycles, even more preferably at least 30 cycles) of digital rubbing test; and combinations thereof.

The water content of a silicone hydrogel contact lens can be measured according to Bulk Technique as disclosed in U.S. Pat. No. 5,849,811.

A silicone hydrogel substrate is a preformed silicone hydrogel contact lens. All the embodiments of a preformed silicone hydrogel contact lens described above are incorporated in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing soft contact lenses, comprising the steps of:
   (1) obtaining a preformed silicone hydrogel contact lens in a dry state;
   (2) subjecting the preformed silicone hydrogel contact lens in the dry state to a surface treatment to obtain a silicone hydrogel contact lens with a base coating thereon, wherein the base coating comprises a prime plasma layer, a reactive polymer layer on top of the prime plasma layer, and reactive functional groups selected from the group consisting of carboxyl groups, primary amino groups, secondary amino groups, and combinations thereof, wherein the surface treatment comprises the sub-steps of
   (a) plasma-treating the surface of the preformed silicone hydrogel contact lens in the dry state with a plasma to obtain a silicone hydrogel contact lens with the prime plasma layer thereon, wherein the plasma is generated in a plasma gas (i.e., an atmosphere) composed of a mixture of an unsaturated $C_2$-$C_4$ hydrocarbon and $CO_2$, wherein the prime plasma layer has a thickness of from about 0.5 nm to about 40 nm, and (b) contacting the silicone hydrogel contact lens with the prime plasma layer thereon with a first aqueous solution including a reactive hydrophilic polymer having multiple reactive functional groups selected from the group consisting of carboxyl groups, primary amino groups, secondary amino groups, and combinations thereof to form the base coating which include the reactive polymer layer of the reactive hydrophilic polymer on top of the prime plasma layer; and (3) heating the silicone hydrogel contact lens with the base coating thereon obtained in step (2), in a second aqueous solution which comprises a water-soluble and thermally-crosslinkable hydrophilic polymeric material having azetidinium groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the silicone hydrogel contact lens in fully hydrated state has a WBUT of at least about 10 seconds and a friction rating of about 3 or lower.

2. The method of invention 1, wherein the plasma gas is composed of a mixture of ethylene and $CO_2$.

3. The method of invention 1, wherein the plasma gas is composed of a mixture of propylene and $CO_2$.

4. The method of invention 1, wherein the plasma gas is composed of a mixture of butylene and $CO_2$.

5. The method of any one of inventions 1 to 4, wherein the prime plasma layer has a thickness of from about 1 nm to about 35 nm.

6. The method of any one of inventions 1 to 5, wherein the prime plasma layer has a thickness of from about 2 nm to about 30 nm.

7. The method of any one of inventions 1 to 6, wherein the prime plasma layer has a thickness of from about 3 nm to about 25 nm.

8. The method of any one of inventions 1 to 7, wherein the silicone hydrogel contact lens in fully hydrated state has a WBUT of at least about 12.5 seconds.

9. The method of any one of inventions 1 to 7, wherein the silicone hydrogel contact lens in fully hydrated state has a WBUT of at least about 15 seconds.

10. The method of any one of inventions 1 to 7, wherein the silicone hydrogel contact lens in fully hydrated state has a WBUT of at least about 17.5 seconds.

11. The method of any one of inventions 1 to 10, wherein the silicone hydrogel contact lens in fully hydrated state has a friction rating of about 2.5 or lower.

12. The method of any one of inventions 1 to 10, wherein the silicone hydrogel contact lens in fully hydrated state has a friction rating of about 2 or lower.

13. The method of any one of inventions 1 to 10, wherein the silicone hydrogel contact lens in fully hydrated state has a friction rating of about 1.5 or lower.

14. The method of any one of inventions 1 to 10, wherein the silicone hydrogel contact lens in fully hydrated state has a friction rating of about 1 or lower.

15. The method of any one of inventions 1 to 14, wherein the water-soluble and thermally-crosslinkable hydrophilic polymeric material further comprises primary groups, secondary amino groups, carboxyl groups, or combinations thereof.

16. The method of any one of inventions 1 to 15, wherein the plasma-treated silicone hydrogel contact lens is placed in contact with the first aqueous solution within a time period of about 40 minutes or less immediately after the plasma-treatment sub-step and before contacting with water, an organic solvent, a mixture of water and one or more organic solvents, a mixture of two or more organic solvent, or any aqueous or organic-based solution free of any reactive polymer.

17. The method of any one of inventions 1 to 15, wherein the plasma-treated silicone hydrogel contact lens is placed in contact with the first aqueous solution within a time period of about 30 minutes or less immediately after the plasma-treatment sub-step and before contacting with water, an organic solvent, a mixture of water and one or more organic solvents, a mixture of two or more organic solvent, or any aqueous or organic-based solution free of any reactive polymer.

18. The method of any one of inventions 1 to 15, wherein the plasma-treated silicone hydrogel contact lens is placed in contact with the first aqueous solution within a time period of about 20 minutes or less immediately after the plasma-treatment sub-step and before contacting with water, an organic solvent, a mixture of water and one or more organic solvents, a mixture of two or more organic solvent, or any aqueous or organic-based solution free of any reactive polymer.

19. The method of any one of inventions 1 to 18, wherein the first aqueous solution has a pH from about 1.0 to about 3.0, and wherein the reactive hydrophilic polymer is a polyanionic polymer comprising carboxyl groups and having a weight average molecular weight of at least 1000 Daltons.

20. The method of invention 19, wherein the first aqueous solution has a pH from about 1.5 to about 2.5.

21. The method of invention 19, wherein the first aqueous solution has a pH from about 1.8 to about 2.0.

22. The method of any one of inventions 19 to 21, wherein the reactive hydrophilic polymer has a weight average molecular weight of from 2000 to 5,000,000 Daltons.

23. The method of any one of inventions 19 to 21, wherein the reactive hydrophilic polymer has a weight average molecular weight of from 5000 to 2,000,000 Daltons.

24. The method of any one of inventions 19 to 21, wherein the reactive hydrophilic polymer has a weight average molecular weight of from 10,000 to 1,000,000 Daltons.

25. The method of any one of inventions 19 to 24, wherein the polyanionic polymer is selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof.

26. The method of any one of inventions 19 to 24, wherein the polyanionic polymer is selected from the group consisting of polyacrylic acid, polymethacrylic acid, poly (acrylic acid-co-methacrylic acid), and a mixture thereof.

27. The method of any one of inventions 1 to 18, wherein the first aqueous solution has a pH from about 9.5 to about 11.0, wherein the reactive hydrophilic polymer is a polycationic polymer comprising primary and/or secondary amino groups and having a weight average molecular weight of at least 1000 Daltons.

28. The method of invention 27, wherein the first aqueous solution has a pH from about 10.0 to about 11.0.

29. The method of invention 27 or 28, wherein the reactive hydrophilic polymer has a weight average molecular weight of from 2000 to 5,000,000 Daltons.

30. The method of invention 27 or 28, wherein the reactive hydrophilic polymer has a weight average molecular weight of from 5000 to 2,000,000 Daltons.
31. The method of invention 27 or 28, wherein the reactive hydrophilic polymer has a weight average molecular weight of from 10,000 to 1,000,000 Daltons.
32. The method of any one of inventions 27 to 31, wherein the polycationic polymer is selected from the group consisting of polyethyleneimine, polyallylamine, polyvinylamine, polyamidoamine, and a mixture thereof.
33. The method of any one of inventions 1 to 18, wherein the reactive hydrophilic polymer comprises azetidinium groups and reactive functional groups selected from the group consisting of primary groups, secondary amino groups, carboxyl groups, and combinations thereof, wherein the reactive hydrophilic polymer has a weight average molecular weight of at least 1000 Daltons, wherein the first aqueous solution has a pH of less than about 8.0.
34. The method of invention 33, wherein the reactive hydrophilic polymer further comprises the azetidinium groups and the carboxyl groups.
35. The method of invention 33 or 34, wherein the reactive hydrophilic polymer has a weight average molecular weight of from 2000 to 5,000,000 Daltons.
36. The method of invention 33 or 34, wherein the reactive hydrophilic polymer has a weight average molecular weight of from 5000 to 2,000,000 Daltons.
37. The method of invention 33 or 34, wherein the reactive hydrophilic polymer has a weight average molecular weight of from 10,000 to 1,000,000 Daltons.
38. The method of any one of inventions 33 to 37, wherein the first aqueous solution has a pH of from about 2.0 to about 8.0.
39. The method of any one of inventions 33 to 37, wherein the first aqueous solution has a pH of from about 6.0 to about 8.0.
40. The method of any one of inventions 33 to 39, wherein the reactive hydrophilic polymer is a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains of a polyamidoamine-epichlorohydrin or a poly(2-oxazoline-co-ethyleneimine)-epichlorohydrin, (ii) from about 5% to about 80% by weight of hydrophilic moieties or second polymer chains of at least one hydrophilicity-enhancing agent having at least two reactive functional groups selected from the group consisting of amino group, carboxyl group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.
41. The method of any one of inventions 1 to 40, wherein the water-soluble thermally crosslinkable hydrophilic polymeric material is a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains of a polyamidoamine-epichlorohydrin or a poly(2-oxazoline-co-ethyleneimine)-epichlorohydrin, (ii) from about 5% to about 80% by weight of hydrophilic moieties or second polymer chains of at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.
42. The method of any one of inventions 1 to 40, wherein the water-soluble thermally crosslinkable hydrophilic polymeric material is a chemically-modified poly(2-oxazoline-co-ethyleneimine)-epichlorohydrin or a chemically-modified polyamidoamine-epichlorohydrin, wherein the chemically-modified poly(2-oxazoline-co-ethyleneimine)-epichlorohydrin and the chemically-modified polyamidoamine-epichlorohydrin independently of each other comprise:
   (i) from about 20% to about 95% by weight of first polymer chains of a polyamidoamine-epichlorohydrin or a poly(2-oxazoline-co-ethyleneimine)-epichlorohydrin;
   (ii) from about 5% to about 80% by weight of hydrophilic moieties or second polymer chains of at least one hydrophilicity-enhancing agent having at least one reactive functional group selected from the group consisting of amino group, carboxyl group, thiol group, and combination thereof; and
   (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent.
43. The method of invention 42, wherein the chemically-modified poly(2-oxazoline-co-ethyleneimine)-epichlorohydrin and the chemically-modified polyamidoamine-epichlorohydrin independently of each other comprise from about 35% to about 90% by weight of the first polymer chains and from about 10% to about 65% by weight of the hydrophilic moieties or the second polymer chains.
44. The method of invention 42, wherein the chemically-modified poly(2-oxazoline-co-ethyleneimine)-epichlorohydrin and the chemically-modified polyamidoamine-epichlorohydrin independently of each other comprise from about 50% to about 85% by weight of the first polymer chains and from about 15% to about 50% by weight of the hydrophilic moieties or the second polymer chains.

45. The method of any one of inventions 42 to 44, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 40% by weight based on the total weight of the hydrophilic polymer.

46. The method of any one of inventions 42 to 44, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 30% by weight based on the total weight of the hydrophilic polymer.

47. The method of any one of inventions 42 to 44, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 20% by weight based on the total weight of the hydrophilic polymer.

48. The method of any one of inventions 42 to 44, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 10% by weight based on the total weight of the hydrophilic polymer.

49. The method of any one of inventions 42 to 48, wherein the hydrophilicity-enhancing agent is: PEG-$NH_2$; PEG-SH; PEG-COOH; $H_2$N-PEG-$NH_2$; HOOC-PEG-COOH; HS-PEG-SH; $H_2$N-PEG-COOH; HOOC-PEG-SH; $H_2$N-PEG-SH; multi-arm PEG with one or more amino, carboxyl or thiol groups; PEG dendrimers with one or more amino, carboxyl or thiol groups; a diamino-, dicarboxyl-, monoamino- or monocarboxyl-terminated homo- or copolymer of a non-reactive hydrophilic vinylic monomer; or combinations thereof, wherein PEG is a polyethylene glycol segment, wherein the non-reactive vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropyl-methacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth) acrylate, a phosphorylcholine-containing vinylic monomer, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol, or combinations thereof.

50. The method of any one of inventions 42 to 48, wherein the hydrophilicity-enhancing agent is a copolymer of (1) at least one reactive vinylic monomer and (2) at least one non-reactive hydrophilic vinylic monomer, wherein the reactive vinylic monomer is present in the copolymer in an amount of about 60% or less by weight, wherein the reactive vinylic monomer is selected from the group consisting of amino-$C_1$-$C_6$ alkyl (meth)acrylate, $C_1$-$C_6$ alkylamino-$C_1$-$C_6$ alkyl (meth)acrylate, allylamine, vinylamine, amino-$C_1$-$C_6$ alkyl (meth)acrylamide, $C_1$-$C_6$ alkylamino-$C_1$-$C_6$ alkyl (meth)acrylamide, acrylic acid, $C_1$-$C_4$ alkylacrylic acid, N,N-2-acrylamidoglycolic acid, beta-methyl-acrylic acid, alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof;
wherein the non-reactive vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol, and combinations thereof.

51. The method of invention 50, wherein the reactive vinylic monomer is present in the copolymer in an amount of from about 0.1% to about 30% by weight.

52. The method of invention 50, wherein the reactive vinylic monomer is present in the copolymer in an amount of from about 0.5% to about 20% by weight.

53. The method of invention 50, wherein the reactive vinylic monomer is present in the copolymer in an amount of from about 1% to about 15% by weight.

54. The method of any one of inventions 51 to 53, wherein the reactive vinylic monomer is acrylic acid.

55. The method of any one of inventions 51 to 53, wherein the reactive vinylic monomer is aminoethylacrylate, aminoethyl methacrylate, aminopropylacrylate, aminopropylmethacrylate, $C_1$-$C_2$ alkylaminoethylacrylate, $C_1$-$C_2$ alkylaminoethylmethacrylate, $C_1$-$C_2$ alkylaminopropylacrylate, $C_1$-$C_2$ alkylaminopropylmethacrylate, aminoethylacrylamide, aminoethylmethacrylamide, aminopropylacrylamide, aminopropylmethacrylamide, $C_1$-$C_2$ alkylaminoethylacrylamide, $C_1$-$C_2$ alkylaminoethylmethacrylamide, $C_1$-$C_2$ alkylaminopropylacrylamide, $C_1$-$C_2$ alkylaminopropylmethacrylamide, or combinations thereof.

56. The method of any one of inventions 51 to 55, wherein the non-reactive vinylic monomer is acrylamide.

57. The method of any one of inventions 51 to 55, wherein the non-reactive vinylic monomer is a phosphorylcholine-containing vinylic monomer.

58. The method of any one of inventions 51 to 55, wherein the non-reactive vinylic monomer is N,N-dimethylacrylamide, N-vinylpyrrolidone, N-vinylacetamide, N-vinyl-N-methyl acetamide, or combinations thereof.

59. The method of any one of inventions 42 to 48, wherein the hydrophilicity-enhancing agent is an amino- or carboxyl-containing polysaccharide, hyaluronic acid, chondroitin sulfate, and combinations thereof.

60. The method of any one of inventions 42 to 59, wherein the weight average molecular weight $M_w$ of the hydrophilicity-enhancing agent is from about 500 to about 1,000,000 Daltons.

61. The method of any one of inventions 42 to 59, wherein the weight average molecular weight $M_w$ of the hydrophilicity-enhancing agent is from about 1,000 to about 500,000 Daltons.

62. The method of any one of inventions 42 to 59, wherein the weight average molecular weight $M_w$ of the hydrophilicity-enhancing agent is from about 5,000 to about 250,000 Daltons.

63. The method of any one of inventions 42 to 44, wherein the hydrophilicity-enhancing agent is: amino-, carboxyl- or thiol-containing monosaccharides; amino-, carboxyl- or thiol-containing disaccharides; and amino-, carboxyl- or thiol-containing oligosaccharides.

64. The method of any one of inventions 42 to 63, wherein the first polymer chains are derived from the polyamidoamine-epichlorohydrin.

65. The method of any one of inventions 42 to 63, wherein the first polymer chains are derived from the poly(2-oxazoline-co-ethyleneimine)-epichlorohydrin.

66. The method of any one of inventions 1 to 65, wherein the step of heating is carried out directly in a sealed lens package containing a packaging solution including the water-soluble and thermally-crosslinkable hydrophilic polymeric material during sterilization by autoclave at a temperature from about 115° C. to about 125° C. for at least about 20 minutes under pressure; wherein the packaging solution comprises from about 0.01% to about 2% by weight of the water-soluble and thermally-crosslinkable hydrophilic polymeric material; wherein the packaging solution comprises at least one buffering agent in an amount sufficient to maintain a pH of from about 6.0 to about 8.5 and has a tonicity of from about 200 to about 450 milliosmol (mOsm), and a viscosity of from about 1 centipoise to about 5 centipoises, at 25° C.

67. A silicone hydrogel contact lens produced according to the method of any one of inventions 1 to 66.

68. The silicone hydrogel contact lens of invention 67, wherein the silicone hydrogel contact lens in a fully-hydrated state has an oxygen permeability of at least about 40 barrers.

69. The silicone hydrogel contact lens of invention 67, wherein the silicone hydrogel contact lens in a fully-hydrated state has an oxygen permeability of at least about 60 barrers.

70. The silicone hydrogel contact lens of invention 67, wherein the silicone hydrogel contact lens in a fully-hydrated state has an oxygen permeability of at least about 80 barrers.

71. The silicone hydrogel contact lens of invention 67, wherein the silicone hydrogel contact lens in a fully-hydrated state has an oxygen permeability of at least about 100 barrers.

72. The silicone hydrogel contact lens of any one of inventions 67 to 71, wherein the silicone hydrogel contact lens in a fully-hydrated state has a water contact angle of about 80 degrees or less.

73. The silicone hydrogel contact lens of any one of inventions 67 to 71, wherein the silicone hydrogel contact lens in a fully-hydrated state has a water contact angle of about 70 degrees or less.

74. The silicone hydrogel contact lens of any one of inventions 67 to 71, wherein the silicone hydrogel contact lens in a fully-hydrated state has a water contact angle of about 60 degrees or less.

75. The silicone hydrogel contact lens of any one of inventions 67 to 71, wherein the silicone hydrogel contact lens in a fully-hydrated state has a water contact angle of about 50 degrees or less.

76. The silicone hydrogel contact lens of any one of inventions 67 to 75, wherein the silicone hydrogel contact lens in a fully hydrated state further has an elastic modulus of about 1.5 MPa or less.

77. The silicone hydrogel contact lens of any one of inventions 67 to 75, wherein the silicone hydrogel contact lens in a fully hydrated state further has an elastic modulus of from about 0.1 MPa to about 1.2 MPa or less.

78. The silicone hydrogel contact lens of any one of inventions 67 to 75, wherein the silicone hydrogel contact lens in a fully hydrated state further has an elastic modulus of from about 0.15 MPa to about 1.1 or less.

79. The silicone hydrogel contact lens of any one of inventions 67 to 75, wherein the silicone hydrogel contact lens in a fully hydrated state further has an elastic modulus of from about 0.2 MPa to about 1.0 MPa.

80. The silicone hydrogel contact lens of any one of inventions 67 to 79, wherein the silicone hydrogel contact lens has a water content of from about 15% to about 70% by weight when fully hydrated.

81. The silicone hydrogel contact lens of any one of inventions 67 to 79, wherein the silicone hydrogel contact lens has a water content of from about 20% to about 65% by weight when fully hydrated.

82. The silicone hydrogel contact lens of any one of inventions 67 to 79, wherein the silicone hydrogel contact lens has a water content of from about 25% to about 60% by weight when fully hydrated.

83. The silicone hydrogel contact lens of any one of inventions 67 to 79, wherein the silicone hydrogel contact lens has a water content of from about 30% to about 55% by weight when fully hydrated.

84. The silicone hydrogel contact lens of any one of inventions 67 to 83, wherein the silicone hydrogel contact lens in a fully hydrated state further has a coating durability characterized by surviving at least one cycle of digital rubbing tests.

85. The silicone hydrogel contact lens of any one of inventions 67 to 83, wherein the silicone hydrogel contact lens in a fully hydrated state further has a coating durability characterized by surviving at least 7 cycles of digital rubbing tests.

86. The silicone hydrogel contact lens of any one of inventions 67 to 83, wherein the silicone hydrogel contact lens in a fully hydrated state further has a coating durability characterized by surviving at least 14 cycles of digital rubbing tests.

87. The silicone hydrogel contact lens of any one of inventions 67 to 83, wherein the silicone hydrogel contact lens in a fully hydrated state further has a coating durability characterized by surviving at least 30 cycles of digital rubbing tests.

88. The silicone hydrogel contact lens of any one of inventions 67 to 83, wherein the silicone hydrogel contact lens in a fully hydrated state further has a coating durability characterized by surviving at least 60 cycles of digital rubbing tests.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements.

The apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Digital Rubbing Tests.

The lenses are digitally rubbed (wearing disposable powder-free latex gloves) with RENU® multi-purpose lens care solution (or another multi-purpose lens care solution) for 20 seconds and then rinsed with saline. The above procedure is repeated for a given times, e.g., from 1 to 30 times, (i.e., number of repetitions of digital rubbing tests which imitate cleaning and soaking cycles).

Lubricity Evaluation.

The lubricity of a lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWpe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

Surface Wettability Tests.

Water contact angle (WCA) on a contact lens is a general measure of the surface wettability of a contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing contact angles ($\theta_a$) or receding contact angles ($\theta_r$) or sessile (static) contact angles. Unless specified, water contact angle is sessile (static) contact angle. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wpe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18 MΩcm and the droplet volume used is 2 µl. Typically, uncoated silicone hydrogel lenses (after autoclave) have a sessile drop contact angle around 120 degrees. The tweezers and the pedestal are washed well with isopropanol and rinsed with DI water before coming in contact with the contact lenses.

Water Break-up Time (WBUT) Tests.

The surface hydrophilicity of lenses (after autoclave) is assessed by determining the time required for the water film to start breaking on the lens surface. Briefly, lenses are removed from the vial and placed in PBS (phosphate buffered saline) for at least two rinses of 30 minutes each and then transferred to fresh PBS in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from PBS and are assigned a WBUT of 0 seconds. Lenses exhibiting WBUT≥10 seconds are considered to have a hydrophilic surface and are expected to exhibit adequate wettability (ability to support the tear film) on-eye.

X-Ray Photoelectron Spectrophotometer (XPS) Tests.

This analytical technique uses x-rays to excite the electrons associated with the atoms at the lens surface. Then collects a portion of the energy emitted by the excited electrons through which analytical information is derived and used to determine the chemical concentrations of elements found at the surface.

XPS is carried out using Sage HR100 spectrometer using a Mg K-alpha XR-50 broad X-ray source (10 kV, 100 W) and a 100 mm PHOIBOS analyzer.

PHMB Uptake Test.

The preservative polyhexamethylene biguanide hydrochloride (PHMB HCl) in solution is measured by the method of High Performance Liquid Chromatography (HPLC). This method may be used specifically for the analysis of PHMB at low ppm levels in Optifree Replenish, Renu fresh multi-purpose, PureMoist and in citrate buffered release solutions.

The PHMB test is carried out using the instrument of Waters H-Class UPLC with Dionex Corona Ultra RS UHPLC detector, with HPLC Columnof Jupiter Wdepore 300A C18. To prepare uptake test sample, one lens will be soaked in 5.0 ml Renu Fresh, in 30 ml PP bottle, for 24 hours at room temperature. The difference of HPLC tests between uptake solution and control Renu solution indicates the PHMB uptake per lens (µg/lens).

Reduction of uptake of cationic/basic substances (TPO Uptake Test):

The success and performance of the method is demonstrated by an assay with Toluidine Blue O (TPO) as a modelling compound for active ingredients like PQ or PHMB of lens care solutions. TPO is a cationic charged dye which acts quantitatively with carboxylate functionalities. TPO or chemical analogues thereof were used in several studies for UV- or fluorescence spectroscopic determination of carboxylate functionalities on interfaces (S. Rödiger et al., *Anal. Chem.*, 83 (2011), 3379), V. B. Ivanov et al., *Surf. and Interface Anal.*, 24 (1996), 257).

In this assay for the determination of bound TPO (TPO uptake) lenses are immersed for 30 minutes in an aqueous solution of TPO (c=50 ppm) at 50° C. and pH=10. Then the lenses are treated for 30 minutes in a 35° C. warm aqueous buffer solution (pH=10) for washing off excess, not bound dye. Then the intensely coloured lens is transferred into 50° C. warm acidified buffer solution (pH=2) for the release of bound TPO. After a treatment time of 30 minutes it is visually checked whether the lens is still coloured or not. If the lens is still coloured the TPO releasing procedure is repeated as long as the lens becomes colourless—usually after 2 or 3 repetitions of the relevant steps. The TPO released into the buffer solutions is then analysed quantitatively at a wavelength of 630 nm by UV-vis spectroscopy. The TPO released is a direct measurement of the TPO uptake from the solutions into which the lenses are immersed.

Plasma Coating Thickness Test.

The plasma coating thickness in Angstrom (Å) is obtained by measuring the thickness increase on silicon wafer after they have been coated using the Plasma Polymerization Coating Machines. The instrument for the thickness measurement is Sentech Ellipsometer SE400 Advanced. It is a precision optical instrument which measures changes in the state of polarized light reflected from the surface of samples, by determining the azimuth of a rotatable polarized prism in the incident beam and the azimuth of a rotatable analyzer prism in the reflected beam for which the intensity of the reflected beam (after passage through the analyzer prism) is a minimum.

Example 2

Contact Lenses:

In examples 4 to 7 following herein uncoated Delefilcon A contact lenses are used. Preparation of the underlying polydimethyl siloxane macromer, of the lens formulation and of the contact lens as such are described e.g. in WO 2014/095690, example 1.

Lenses are fully extracted by MEK (methyl ethyl ketone) and vacuum dried at 105° C. for a minimum of 2 hours before plasma coating.

After plasma coating the lenses are placed in polypropylene shells and provided with about 0.65 ml of IPC-1 saline (see example 3).

Example 3

1 Mm Paa (pH=2) Solution.

To prepare 1 mM Poly(Acrylic Acid) (PAA) aqueous solution, 0.072 g PAA (Carbopol 907, powder) is gradually transferred into the 1000 ml bottle containing distilled water under stirring. Ensure the solution is stirring during the PAA addition. Stir the solution on the stirrer plate at room temperature overnight (~24 hrs). Verify that the PAA has fully dissolved. If the PAA has NOT fully dissolved, continue stirring and wait until no particulates are observed. 37% Hydrochloric acid solution (HCl, Fluka-318949) is applied to adjust pH of the 1 mM PAA solution to 2 under the pH meter.

PBS (Phosphate-Buffered Saline).

To prepare PBS saline, 8 g of NaCl; 0.2 g of KCl; 1.44 g of $Na_2HPO_4$; 0.24 g of $KH_2PO_4$ are dissolved in 800 ml distilled $H_2O$. After adjusting pH to 7.4 with HCl, additional distilled $H_2O$ is then added to meet 1 L volume.

Ipc-1 Saline.

Poly(AAm-co-AA)(90/10) partial sodium salt (~90% solid content, poly(AAm-co-AA) 90/10, Mw 200,000) is purchased from Polysciences, Inc. and used as received. PAE (Kymene, an azetidinium content of 0.46 assayed with NMR) is purchased from Ashland as an aqueous solution and used as received. An in-package-crosslinking (IPC) saline is prepared by dissolving about 0.07% w/w of poly (AAm-co-AA)(90/10) and about 0.15% of PAE (an initial azetidinium millimolar equivalents of about 8.8 millimole) in PBS (about 0.044 w/w % $NaH_2PO_4.H_2O$, about 0.388 w/w/% $Na_2HPO_4.2H_2O$, about 0.79 w/w % NaCl) and adjusting the pH to 7.2-7.4. Then the IPC saline is heat pre-treated for about 6 hours at about 60° C. (heat pretreatment). During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron PES membrane filter and cooled down back to room temperature. 5 ppm hydrogen peroxide is then added to the final IPC saline to prevent bioburden growth and the IPC saline is filtered using a 0.22 micron PES membrane filter.

Dry Lenses.

Silicone hydrogel contact lenses prepared in Example 2 are individually transferred to the dry tray and vacuum dried at 105° C. for minimum 2 hours before plasma coating.

Plasma Coating.

After loading the lenses in the plasma chamber of a rotary plasma treatment system, the chamber is then pumped down via rotary vacuum pump system to an absolute vacuum pressure 100 to 0 pa for 90 min. The plasma gas mixture, e.g. ethylene/$CO_2$ is then introduced into the chamber by means of mass flow control valves, pressure is monitored by the vacuum diapharm gauge, measured pressure is converted to electrical voltage. The plasma time is about 11 min. Power across the electrodes is between 20 to 50 watts (power is preferably at 30 watts); Current is between 100 mA±10 mA (current set at 100 mA); Frequency set at 15 kHz for a good coating cycle="Si wafer thickness~240 Å±60 Å"; Voltage is based on the current setting and the material inside chamber.

Plasma Quenching.

After the plasma coating, preferably, the plasma coated lenses are quickly (<60 s) transferred into 1 mM PAA aqueous solution with 1 min.

Packing/Autoclaving.

After rinsing in PBS twice for 30 min, the lenses are then packed in a Corona treated shell with IPC-1 saline for autoclave at about 120° C. for about 45 min.

Lens Characterization.

The wettability (measured by water contact angle), surface hydrophilicity (measured by WBUT) and lubricity (measured by friction rating) of silicone contact lenses after being subjected to one of surface treatments above are determined according to the procedures described in Example 1.

Example 4

A bell jar (Shinko-Seiki, model MPR-045) magnetron plasma reactor is loaded with fully extracted, dried Delefilcon A contact lenses of example 2, closed and evacuated. Plasma is generated by a gas mixture of ethylene and carbon dioxide at flow rates of 1 sccm and 6 sccm, respectively, at a pressure of 50 mTorr and a power of 42 W. The plasma deposition is performed for 10 min. During the treatment the lenses are rotated through the plasma zone with 14 rpm. For control experiments Si-wafers are plasma coated simultaneously with the lenses.

Example 5

The plasma treated lenses and Si wafers of example 4 are placed in packaging shell together with 0.65 ml of IPC-1 saline containing reactive PAAm-PAA modified PAE, see example 3, for the top coating. The shell is sealed with an aluminium foil and autoclaved at 121° C. for 45 min.

Example 6

(control experiment): Lenses and Si-wafers are plasma coated according to example 4, but only with ethylene as plasma gas with a flow rate of 3 sccm and a plasma generation at a power of 32 W.

Example 7

(control experiment): The plasma treated lens and Si-wafers of example 6 are treated according to example 5 with the same PAAm-PAA modified PAE.

Example 8

After treatment the lenses are characterized by water contact angle measurements (WCA), determination of the carboxylate content of the surfaces by TPO uptake, coating thickness by ellipsometry, and lubricity evaluation (as described in example 1). The results of the examples are summarized in Tables 1 and 2.

TABLE 1

|  | Contact Lens | | Si-wafer Thickness |
|---|---|---|---|
|  | WCA | TPO-Uptake (nmol) | (refractive index) (nm) |
| Example 4 | 17° | 19 | 16 (1.5816) |
| Example 5 | 35° | na | 93 (1.5121) |
| Example 6 | 89° | 5 | 33 (1.5969) |
| Example 7 | 75° | na | 33 (1.6196 |
| Uncoated | 116° | 4 | na |

TABLE 2

|  |  | Sudan Black Staining Test | |
|---|---|---|---|
|  | Lubricity | pH = 7 | pH = 2 |
| Example 4 | 4 | 2 | 1 |
| Example 5 | 1 | 2 | 2 |
| Example 6 | 4 | 0 | na |
| Example 7 | 3 | 0 | na |
| Uncoated | >4 | 0 | na |

The Sudan Black Staining Test, which is generally known in the art, evaluates hydrophobicity/hydrophilicity of a lens surface, wherein a hydrophobic surfaces becomes completely stained, a hydrophilic or water film carrying lens surface is not stained. The staining is evaluated on a scale from 0 to 2 with 0=stained lens, 1=slightly stained lens and 2=not stained or almost not stained lens.

Further the Si-wafers are evaluated for the elemental concentration by XPS measurements and the results are summarized in Table 3.

TABLE 3

|  | Elemental Concentration [at-%] | | | |
|---|---|---|---|---|
|  | C | O | N | Si |
| Example 4 | 68.0 | 26.4 | 1.7 | 3.9 |
| Example 5 | 67.0 | 22.2 | 8.0 | 2.8 |
| Example 6 | 83.6 | 14.0 | 1.2 | 1.0 |
| Example 7 | 78.4 | 17.0 | 3.0 | 1.3 |
| Uncoated | 37.4 | 29.5 | 0.3 | 32.7 |

The invention claimed is:

1. A method for producing soft contact lenses, comprising the steps of:
   (1) obtaining a preformed silicone hydrogel contact lens in a dry state;
   (2) subjecting the preformed silicone hydrogel contact lens in the dry state to a surface treatment to obtain a silicone hydrogel contact lens with a base coating thereon, wherein the base coating comprises a prime plasma layer, a reactive polymer layer on top of the prime plasma layer, and reactive functional groups selected from the group consisting of carboxyl groups, primary amino groups, secondary amino groups, and combinations thereof, wherein the surface treatment comprises the sub-steps of
      (a) plasma-treating the surface of the preformed silicone hydrogel contact lens in the dry state with a plasma to obtain a silicone hydrogel contact lens with the prime plasma layer thereon, wherein the plasma is generated in a plasma gas composed of a mixture of $CO_2$ and an unsaturated $C_2$-$C_4$ hydrocarbon selected from the group consisting of ethylene, propylene and butylene, wherein the prime plasma layer has a thickness of from about 0.5 nm to about 40 nm, and
      (b) contacting the silicone hydrogel contact lens with the prime plasma layer thereon with a first aqueous solution including a reactive hydrophilic polymer to form the base coating which include the reactive polymer layer of the reactive hydrophilic polymer on top of the prime plasma layer, wherein the first aqueous solution has a pH from about 9.5 to about 11.0, wherein the reactive hydrophilic polymer is a polycationic polymer comprising primary and/or secondary amino groups and having a weight average molecular weight of at least 1000 Daltons, wherein sub-step (b) is carried out within a time period of about 40 minutes or less immediately after sub-step (a) and before contacting with water, an organic solvent, a mixture of water and one or more organic solvents, a mixture of two or more organic solvent, or any aqueous or organic-based solution free of any reactive polymer; and
   (3) heating the silicone hydrogel contact lens with the base coating thereon obtained in step (2), in a second aqueous solution which comprises a water-soluble and thermally-crosslinkable hydrophilic polymeric material having azetidinium groups and optionally primary or secondary amino groups and/or carboxyl groups, at a temperature of from about 60° C. to about 140° C. for a time period sufficient long to crosslink the water-soluble thermally-crosslinkable hydrophilic polymeric material and the base coating so as to form a hydrogel coating on the silicone hydrogel contact lens, wherein the silicone hydrogel contact lens in fully hydrated state has a WBUT of at least 10 seconds and a friction rating of about 3 or lower.

2. The method of claim 1, wherein the polycationic polymer is selected from the group consisting of polyethyleneimine, polyallylamine, polyvinylamine, polyamidoamine, and a mixture thereof.

3. The method of claim 1, wherein the reactive hydrophilic polymer comprises azetidinium groups and reactive functional groups selected from the group consisting of primary groups, secondary amino groups, and combinations thereof, wherein the reactive hydrophilic polymer has a weight average molecular weight of at least 1000 Daltons, wherein the first aqueous solution has a pH of less than 8.0.

4. The method of claim 3, wherein the reactive hydrophilic polymer is a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least two reactive functional groups selected from the group consisting of primary amino groups, secondary amino groups, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one primary or secondary amino group of the hydrophilicity-enhancing agent, and (iii) azetidinium groups which are parts of the first polymer chains or pendant or terminal groups covalently attached to the first polymer chains.

5. The method of claim 4, wherein the water-soluble thermally crosslinkable hydrophilic polymeric material is selected from the group consisting of a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, and combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.

6. The method of claim 5, wherein the water-soluble thermally crosslinkable hydrophilic polymeric material is a chemically-modified poly(2-oxazoline-co-ethyleneimine)-epichlorohydrin or a chemically-modified polyamidoamine-epichlorohydrin, wherein the chemically-modified poly(2-oxazoline-co-ethyleneimine)-epichlorohydrin and the chemically-modified polyamidoamine-epichlorohydrin independently of each other comprise:
  (i) from about 20% to about 95% by weight of first polymer chains derived from a polyamidoamine-epichlorohydrin or a poly(2-oxazoline-co-ethyleneimine)-epichlorohydrin;
  (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof; and
  (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent.

7. The method of claim 6, wherein the hydrophilicity-enhancing agent is a hydrophilic polymer having one or more amino, carboxyl and/or thiol groups and a weight average molecular weight of from about 500 to about 1,000,000 Daltons, wherein the content of the amino, carboxyl and/or thiol groups in the hydrophilic polymer as the hydrophilicity-enhancing agent is less than about 40% by weight based on the total weight of the hydrophilic polymer.

8. The method of claim 6, wherein the hydrophilicity-enhancing agent is selected from the group consisting of: PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a diamino-, dicarboxyl-, monoamino- or monocarboxyl-terminated homo- or co-polymer of a non-reactive hydrophilic vinylic monomer; and combinations thereof, wherein PEG is a polyethylene glycol segment, wherein the non-reactive vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, C$_1$-C$_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol, and combinations thereof, wherein the weight average molecular weight $M_w$ of the hydrophilicity-enhancing agent is from about 500 to about 1,000,000 Daltons.

9. The method of claim 6, wherein the hydrophilicity-enhancing agent is a copolymer which is a polymerization product of a composition comprising (1) about 60% by weight or less by weight of at least one reactive vinylic monomer and (2) at least one non-reactive hydrophilic vinylic monomer, wherein the reactive vinylic monomer is selected from the group consisting of amino-$C_1$-$C_6$ alkyl (meth)acrylate, $C_1$-$C_6$ alkylamino-$C_1$-$C_6$ alkyl (meth)acrylate, allylamine, vinylamine, amino-$C_1$-$C_6$ alkyl (meth)acrylamide, $C_1$-$C_6$ alkylamino-$C_1$-$C_6$ alkyl (meth)acrylamide, acrylic acid, $C_1$-$C_4$ alkylacrylic acid, N,N-2-acrylamidoglycolic acid, beta-methyl-acrylic acid, alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof; wherein the weight average molecular weight $M_w$ of the hydrophilicity-enhancing agent is from about 500 to about 1,000,000 Daltons,
wherein the non-reactive vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), and combinations thereof.

10. The method of claim 6, wherein the hydrophilic polymer as the hydrophilicity-enhancing agent is selected from the group consisting of an amino-containing polysaccharide, a carboxyl-containing polysaccharide, hyaluronic acid, chondroitin sulfate, and combinations thereof.

11. The method of claim 6, wherein the hydrophilicity-enhancing agent is selected from the group consisting of amino-containing monosaccharides; carboxyl-containing monosaccharides; thiol-containing monosaccharides; amino-containing disaccharides; carboxyl-containing disaccharides; thiol-containing disaccharides; amino-containing oligosaccharides; carboxyl-containing oligosaccharides; and thiol-containing oligosaccharides.

12. The method of claim 6, wherein the first polymer chains are derived from the polyamidoamine-epichlorohydrin.

13. The method of claim 6, wherein the first polymer chains are derived from the poly(2-oxazoline-co-ethyleneimine)-epichlorohydrin.

14. The method of claim 6, wherein the step of heating is carried out directly in a sealed lens package containing a packaging solution including the water-soluble and thermally-crosslinkable hydrophilic polymeric material during sterilization by autoclave at a temperature from about 115° C. to about 125° C. for at least 20 minutes under pressure; wherein the packaging solution comprises from about 0.01% to about 2% by weight of the water-soluble and thermally-crosslinkable hydrophilic polymeric material;
wherein the packaging solution comprises at least one buffering agent in an amount sufficient to maintain a pH of from about 6.0 to about 8.5 and has a tonicity of from about 200 to about 450 milliosmol (mOsm), and a viscosity of from about 1 centipoise to about 5 centipoises, at 25° C.

15. A silicone hydrogel contact lens produced according to the method of claim 6.

16. The silicone hydrogel contact lens of claim 15, wherein the silicone hydrogel contact lens in a fully hydrated state further has at least one property selected from the group consisting of: an oxygen permeability of at least 40 barrers; an elastic modulus of about 1.5 MPa or less; a water content of from about 15% to about 70% by weight when fully hydrated; a water contact angle of about 80 degrees or less; a coating durability characterized by surviving at least one cycle of digital rubbing test; and combinations thereof.

* * * * *